United States Patent

[11] 3,624,501

| [72] | Inventor | Walter Francis Joseph<br>San Diego, Calif. |
|---|---|---|
| [21] | Appl. No. | 63,139 |
| [22] | Filed | Aug. 12, 1970 |
| [45] | Patented | Nov. 30, 1971 |
| [73] | Assignee | The United States of America as represented by the Secretary of the Navy |

[54] TIME CONSTANT SWITCHING SYSTEM FOR A METER APPARATUS
6 Claims, 1 Drawing Fig.

| [52] | U.S. Cl. | 324/111, 324/128, 328/132 |
|---|---|---|
| [51] | Int. Cl. | G01r 1/00, G01r 1/22 |
| [50] | Field of Search | 324/111, 115, 102, 126, 128, 131, 78 I, 78 E; 328/132; 307/152; 235/183 |

[56] References Cited
UNITED STATES PATENTS

| 2,159,790 | 5/1939 | Freystedt et al. | 324/128 |
| 3,078,371 | 2/1963 | Mohring | 324/78 I |
| 3,529,240 | 9/1970 | Sanders | 324/119 X |

*Primary Examiner*—Rudolph V. Rolinec
*Assistant Examiner*—Ernest F. Karlsen
*Attorneys*—R. S. Sciascia and Charles D. B. Curry

ABSTRACT: A time constant switching device which will allow the integrating time constant of a rate meter to be changed without affecting the average output voltage, even when zero suppression and scale expansion are employed to obtain high sensitivity meter readings. This is accomplished by switching an additional capacitor into an integrating circuit said additional capacitor being precharged by an operational amplifier, to the voltage of the capacitor in the integrating circuit.

The invention described herein may be manufactured and used by or for the Government of the United States of America for governmental purposes without the payment of any royalties thereon or therefor.

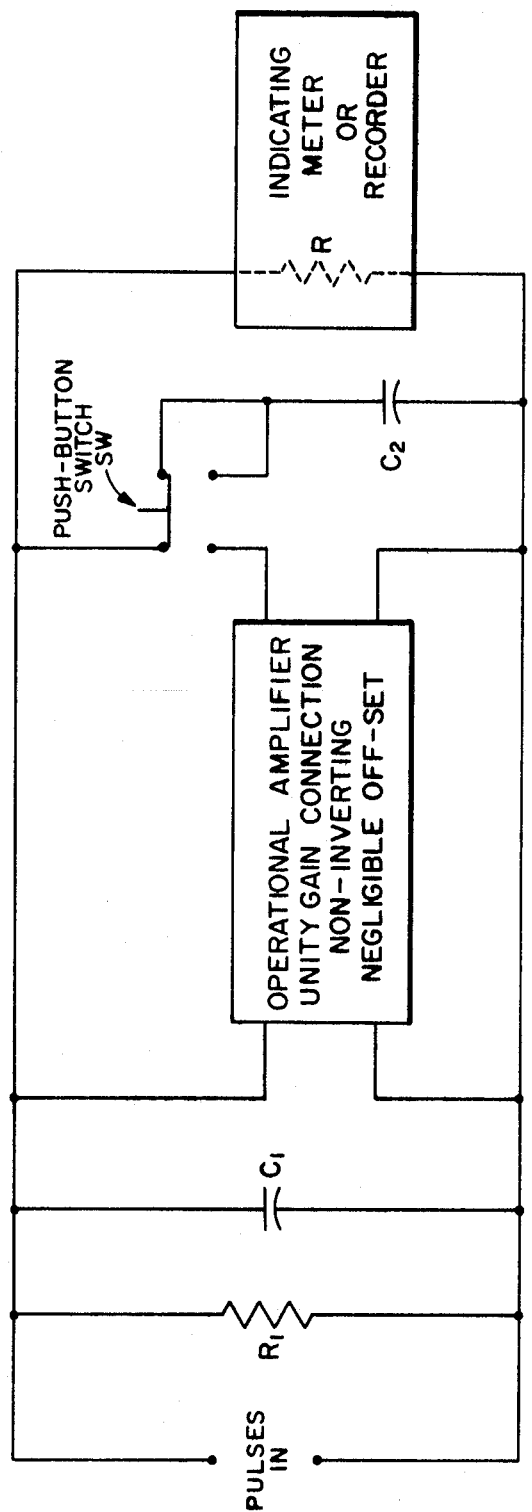

TIME CONSTANT SWITCHING SYSTEM FOR A METER APPARATUS

BACKGROUND OF THE INVENTION

This invention relates generally to an electrical system which will allow the integrating time constant of a rate meter to be changed without affecting the average output voltage; and more particularly to a unity-gain noninverting amplifier array to keep an additional capacitor charged to the voltage of an integrating capacitor circuit. Thus, when a switch is operated to place the additional capacitor in parallel with the integrating capacitor there are no transients to affect reading accuracy of the rate meter. This system allows easy and rapid initial settings, of the rate meter, using a short time constant. The time constant can then be changed to a large value for increased reading accuracy without affecting the average output reading. This system becomes particularly useful where a suppressed zero and or expanded scales are employed to obtain high sensitivity.

The prior system would switch a large capacitor out of the circuit leaving in a much smaller capacitor. This changed the time constant from a long period to a short period. This old system has a major disadvantage in that, during operation, a change in time constant is accompanied by a transient change in output indication. The accompanying change in the time constant is accompanied by a transient change in the output indicators. When the time constant is changed to a shorter period, the indicator excursion is correspondingly short; but a change to a larger time constant results in an indicator excursion of a long duration. This is due to the time required by the capacitor, which is switched in to the circuit to attain its final value of charge. The time constant switching system discussed in this disclosure has been used to obtain an analog record of the count rate from a nuclear radiation detector. It should be noted that the disclosed invention is not limited to the recording of a count rate from a nuclear radiation detector but has application wherever it is desirable to measure random input pulse rates signals varying rapidly over several scale lengths.

SUMMARY OF THE INVENTION

The advantage of this system over the prior art is its ability to enable instrument adjustments to be made quickly and easily even when zero suppression and scale expansion is used. In the past the process of adjusting the rate meter to produce a scale reading was difficult and time consuming if not impossible, since the signal would be varying over several scale lengths during the time of switchover and expansion. When signal conditions are changing rapidly and it is desired to follow them, the incorporation of this invention in the rate meter is essential. The feature that is believed new is the use of an operational amplifier to keep the large value capacitor charged to the signal voltage when it is switched out of the integrating circuit. By using this system only minimal transients result from changing the time constant to a short one and then back to a larger one.

STATEMENTS OF THE OBJECTS OF THE INVENTION

It is the primary object of this invention to provide a circuit which will allow the integrating time constant of a rate meter to be changed without affecting the average output voltage.

Another object of this invention is to allow an easy and rapid initial setting of a rate meter, using a short time constant.

It is a particular feature of the invention, that the circuit allows increased reading accuracy without transients, particularly where a suppressed zero and expanded scale are employed to obtain high sensitivity.

Other objects and features will be apparent from the following description of the invention, and from the accompanying drawing in which the sole figure is a schematic diagram of the preferred embodiment of the present invention.

Referring now to the drawing wherein resistor $R_1$ and capacitor $C_1$ comprise an integrating circuit (which could be the output portion of a diode pump integrator). The time constant, $R_1C_1$ is a relatively short one (i.e., 1 second) and switch SW is shown as a pushbutton type (in various applications it could be a toggle or rotary type). With the switch making contact as shown in the figure, capacitor $C_2$ is connected in parallel with capacitor $C_1$, resulting in a long time constant. The operational amplifier is connected as a noninverting, unity gain amplifier with essentially zero offset voltage in the output. This results in a high input impedance, a low output impedance and a voltage output which very closely approximates the input voltage. When switch SW is depressed, capacitor $C_2$ is disconnected from the integrating circuit, RC, and is connected to the amplifier output. Capacitor $C_2$ is kept charged to the average signal voltage while, at the same time, a short time constant is obtained in the indicating circuit. Circuit adjustments such as range switching, zero suppression, and output meter sensitivity can be made conveniently and rapidly with a short time constant. Allowing the switch SW to return to its original position allows capacitor $C_2$ to be again connected across the integrating circuit since it has been kept charged to the signal voltage by the amplifier output, the only deviation in output indication is that due to the possible random variations associated with the shorter time constant.

It should be noted that an alternative modification can be made by changing switch SW from a pushbutton type to any other type depending on the desired application. The application described above uses the system as a speedup switch. The system can also be used for the main time constant switching of the rate meter.

Obviously many modifications and variations of the present invention are possible in the light of the above teachings. It is therefore to be understood that within the scope of the appended claims the invention may be practiced otherwise than as specifically described.

I claim as my invention:

1. A time constant switching system for controlling the transient change in the average output voltage of a rate meter comprising, in combination:
   a. integrating circuit means;
   b. indicating means;
   c. means connecting the output of the integrating means to the indicating means;
   d. charge storing means intermittently operatively connected to said integrating circuit means;
   e. noninverting amplification means intermittently operatively connected to said charge storing means and operatively connected to the output of the integrating circuit means;
   f. switch means connecting the output of the amplification means across the charge storing means and disconnecting the charge storing means from the integrating circuit means and indicator means when in a first state and disconnecting the output of the amplification means from the charge storing means and connecting the charge storing means in parallel with the integrating circuit means and the indicating means when in a second state to control the transient change in the output voltage of said rate meter.

2. The invention according to claim 1, wherein said switch means comprises a two-position switch means with a first position and a second position when said switch means is in the first position said charge storing means is connected in parallel with said integrating circuit means when said switch means is in the second position said charge storing means is disconnected from said integrating means and connected to said amplification means whereby the amplification means is arranged keep said charge storing means charged to the value of said integrating means.

3. The invention according to claim 2, where said integrating means consists of a resistor and a capacitor in parallel connection with each other.

4. The invention according to claim 2, where the noninverting amplification means is a unity-gain amplifier with essentially zero offset voltage.

5. The invention according to claim 3 wherein the charge storing means is a capacitor connected in parallel with the integrating means and the noninverting amplification means.

6. The invention according to claim 4 wherein the charge storing means is a capacitor.

* * * * *